Patented Mar. 26, 1940

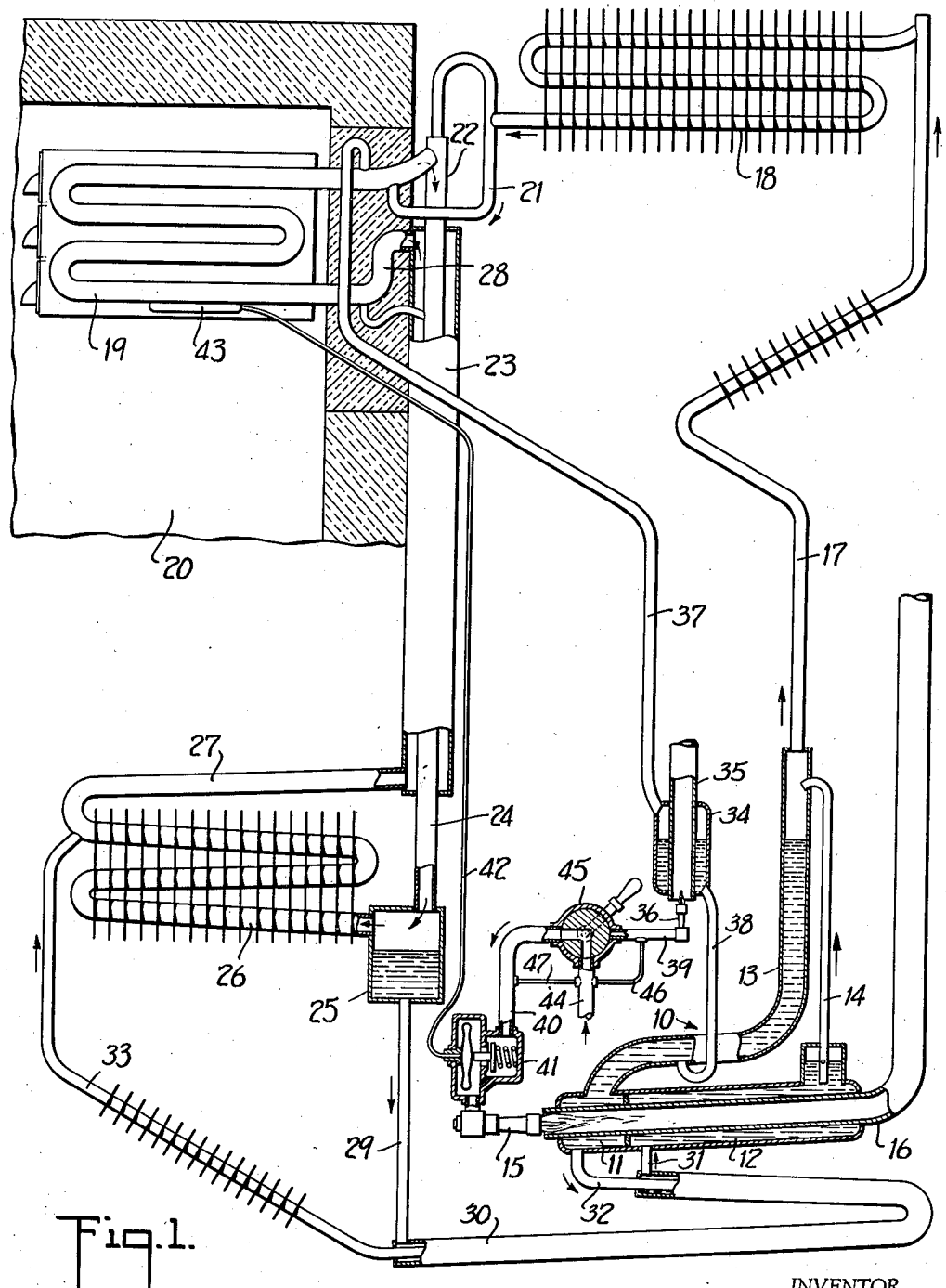

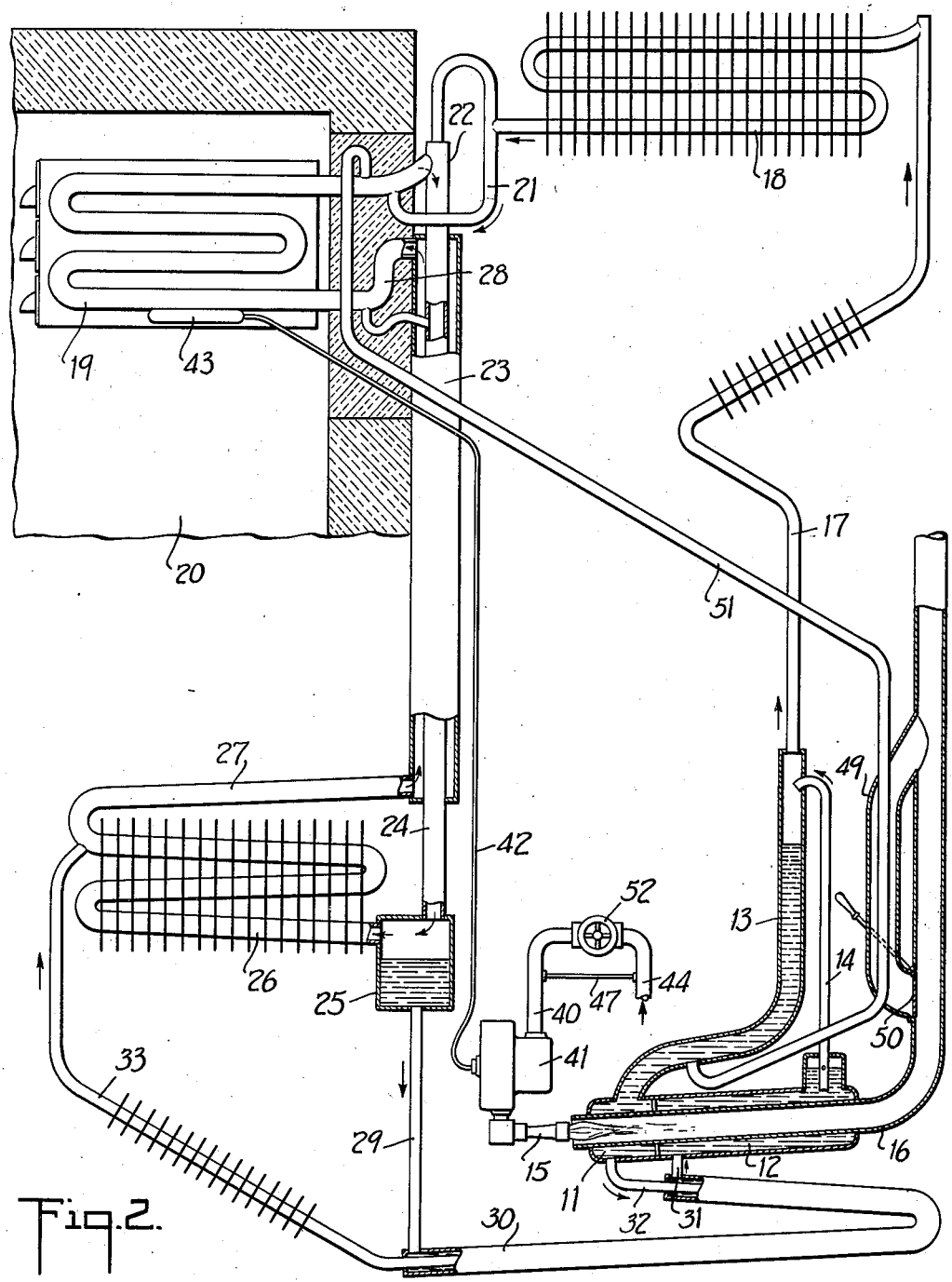

2,195,288

UNITED STATES PATENT OFFICE 2,195,288

REFRIGERATION

Harry C. Shagaloff, Evansville, Ind., assignor to Servel, Inc., New York, N. Y., a corporation of Delaware Application December 21, 1938, Serial No. 246,952

5 Claims. (Cl. 62—5)

My invention relates to refrigeration and more particularly to quick melting of frost on the cooling element of an absorption type refrigeration system.

I maintain a segregated quantity of absorption liquid in an absorption type refrigeration system, and heat this liquid to expel refrigerant vapor and conduct the vapor into the cooling element of the system when it is desired to quickly raise the temperature thereof to melt frost, as more fully set forth in the following description in connection with the accompanying drawings of which Fig. 1 shows more or less diagrammatically a pressure equalized absorption refrigeration system embodying the invention; and Fig. 2 is a similar view of a system like that in Fig. 1 illustrating a modification of the invention.

Referring to Fig. 1, a generator 10 includes a horizontal portion having a chamber 11 and a chamber 12, a standpipe 13 connected at its lower end to chamber 11, and a thermo-syphon or vapor liquid lift conduit 14 extending from within chamber 12 upward to the upper part of standpipe 13. The generator is heated by a gas burner 15 arranged so that the flame projects into the lower end of a flue 16 which extends through chambers 11 and 12. The upper end of standpipe 13 is connected by a conduit 17 to the upper end of an air cooled condenser 18. A coil type evaporator 19 is located in a refrigerator storage compartment 20. The upper end of evaporator 19 is connected to the lower end of condenser 18 by a conduit 21. The upper end of evaporator 19 is also connected by a conduit 22, inner passage of a gas heat exchanger 23, and a conduit 24 to an absorber vessel 25. The upper part of vessel 25 is connected to the lower end of an air cooled absorber coil 26. The upper end of absorber coil 26 is connected by a conduit 27, outer passage of gas heat exchanger 23, and a conduit 28 to the lower end of evaporator coil 19.

The lower part of absorber vessel 25 is connected by a conduct 29, outer passage of a liquid heat exchanger 30, and a conduit 31 to generator chamber 12. Generator chamber 11 is connected by a conduit 32, inner passage of liquid heat exchanger 30, and a conduit 33 to the upper part of absorber coil 26.

At a level adjacent the level of the upper end of absorber coil 26 I provide an auxiliary vessel 34 having a flue 35. Vessel 34 is heated by a gas burner 36 arranged so that the flame is projected upward in the lower end of flue 35. The top of vessel 34 is connected by an upward looped conduit 37 to the evaporator 19. The bottom of vessel 34 is connected by a downward looped conduit 38 to the lower part of standpipe 13.

Gas flows to burner 36 through a conduit 39. Gas flows to main burner 15 through a conduit 40. In conduit 40 is a thermostatic gas valve 41 connected by a capillary tube 42 to a sensitive element 43 on the evaporator 19 so that valve 41 operates responsive to a temperature condition affected by the evaporator. A gas supply conduit 44 is connected by a selective valve 45 to gas conduits 39 and 40. Small conduits 46 and 47 provide bypass flow of gas around valve 45 to conduits 39 and 40 respectively to maintain pilot flames in burners 36 and 15 when one or the other is cut off by valve 45.

In operation, valve 45 is normally turned to the position shown and burners 15 and 36 lighted, burner 36 operating with a pilot flame and burner 15 operating with a flame determined by thermostatic valve 41. Heating of generator 10 by burner 15 causes expulsion of refrigerant vapor, such as ammonia, from solution in absorption liquid, such as water. Vapor formed in chamber 12 rises through conduit 14 and causes upward flow of liquid from chamber 12 into standpipe 13 in known manner. Vapor expelled in chamber 11 rises through standpipe 13. Vapor flows from the upper end of standpipe 13 through conduit 17 to the upper end of condenser 18. Vapor is condensed to liquid in condenser 18. The liquid flows from the lower end of the condenser through conduit 21 into evaporator 19.

Refrigerant liquid flows downward in evaporator 19 and evaporates and diffuses into an inert auxiliary pressure equalizing gas, such as hydrogen, producing a refrigerating effect for cooling compartment 20. Gas and vapor mixture flows from the upper end of evaporator 19 through conduit 22, gas heat exchanger 23, and conduit 24 into absorber vessel 25. The vapor thence flows into absorber 26.

Weakened absorption liquid flows from generator chamber 11 through conduit 32, liquid heat exchanger 30 and conduit 33 into the upper end of absorber 26. Absorption liquid runs downward through the absorber coil into vessel 25. Refrigerant vapor is absorbed into solution in the absorber. Weak gas flows from the upper end of absorber coil 26 through conduit 27, gas heat exchanger 23, and conduit 28 back to the evaporator. Enriched absorption liquid flows from absorber vessel 25 through conduit 29, liquid heat exchanger 30, and conduit 31 into generator chamber 12.

When the system is operated so that evaporator 19 is maintained at a temperature below freezing, this part becomes coated with frost which should be removed at intervals. To do this, valve 45 is turned so that gas supply conduit 44 is connected to conduit 36. This puts burner 36 on full flame and reduces burner 15 to pilot flame. The burner 36 heats vessel 34. This vessel contains absorption liquid at substantially the same surface level as that in the generator standpipe 13. The heat of burner 36 causes ammonia vapor to be expelled from solution in vessel 34. The vapor flows from vessel 34 through conduit 37 into the evaporator 19. This causes the temperature of evaporator 19 to rise quickly and cause melting of frost on the outer surface. When the coating of frost is removed, valve 45 is returned to the position shown in the drawings and normal operation as described above is resumed.

The refrigeration system shown in Fig. 2 is identical with that described in connection with Fig. 1, and like parts are indicated by the same reference numerals. A generator flue 16 is provided with a bypass section 49 controlled by a damper 50. Vessel 34 shown in Fig. 1 is omitted and conduits 37 and 38 in Fig. 1 combine into a single conduit 51 which extends upward through the flue branch 49. The two-way valve of Fig. 1 is replaced by an ordinary shutoff valve 52.

Flue damper 50 is normally closed as shown in Fig. 2 and conduit 51 is not heated. When it is desired to melt frost on the evaporator 19, gas valve 52 is closed to reduce burner 15 to pilot flame, and damper 50 is opened, causing products of combustion to flow through the flue branch 49. Solution in conduit 51 is heated and refrigerant vapor is expelled from solution. The hot vapor flows upward through conduit 51 into evaporator 19 and the evaporator-absorber gas circuit. When the frost is melted, damper 50 is closed and gas valve 52 opened, returning the refrigeration system to normal operation under the control of thermostatic valve 41 as described in connection with Fig. 1.

Various other modifications and changes may be made within the scope of the invention which is not limited except as indicated in the following claims.

What is claimed is:

1. An absorption refrigeration system having a place of evaporation, a place of absorption, a place of condensation, and a plurality of places of vapor expulsion connected to receive liquid from said place of absorption, means including said place of condensation for conducting refrigerant fluid from one of said places of expulsion to said place of evaporation, means for conducting vapor directly from another of said places of expulsion to said place of evaporation, and means for heating said places of vapor expulsion in alternation.

2. A method of refrigeration which includes evaporating liquid refrigerant fluid at a low vapor pressure to produce refrigeration, creating said low vapor pressure by absorption of refrigerant fluid vapor into an absorbent, expelling refrigerant fluid vapor from said absorbent at a first place of vapor expulsion, condensing expelled vapor to liquid, supplying the liquid for said evaporation step, and intermittently raising said low vapor pressure by introducing expelled vapor from a second place of vapor expulsion directly into the presence of liquid refrigerant fluid to be evaporated.

3. In an absorption refrigeration system including an evaporator, an absorber, a generator, and a condenser, a second generator, said first generator and absorber being connected to form a circuit for absorption liquid, and said second generator being connected to contain absorption liquid in said circuit and deliver vapor to said evaporator, and means to heat said second generator to cause flow of vapor to said evaporator to raise the temperature of the evaporator when it is desired to cause melting of frost thereon.

4. In a refrigeration system as set forth in claim 3, a heater for said first generator, and means for turning said heater off when said means to heat said second generator is started.

5. A refrigeration system as set forth in claim 3 in which said first generator is heated by a burner, and a flue for conducting heat and products of combustion of said burner, and said means to heat said second generator is a controlled branch of said flue.

HARRY C. SHAGALOFF.